US010860738B2

(12) United States Patent
Czerkowicz et al.

(10) Patent No.: US 10,860,738 B2
(45) Date of Patent: Dec. 8, 2020

(54) AUGMENTED METADATA AND SIGNATURES FOR OBJECTS IN OBJECT STORES

(71) Applicant: HEWLETT PACKARD ENTERPRISE DEVELOPMENT LP, Houston, TX (US)

(72) Inventors: John Michael Czerkowicz, Westborough, MA (US); Glenn S. Watkins, Westborough, MA (US); Peter William Madany, Westborough, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 264 days.

(21) Appl. No.: 15/884,121

(22) Filed: Jan. 30, 2018

(65) Prior Publication Data

US 2019/0236302 A1    Aug. 1, 2019

(51) Int. Cl.
*G06F 21/00* (2013.01)
*G06F 21/62* (2013.01)
*G06F 16/13* (2019.01)
*G06F 16/178* (2019.01)
*H04L 9/32* (2006.01)
*H04L 9/06* (2006.01)

(52) U.S. Cl.
CPC ........ *G06F 21/6227* (2013.01); *G06F 16/137* (2019.01); *G06F 16/178* (2019.01); *H04L 9/3247* (2013.01); *H04L 9/3297* (2013.01); *H04L 9/0643* (2013.01)

(58) Field of Classification Search
CPC ... G06F 21/6227; G06F 16/137; G06F 16/178
USPC .......................................................... 713/167
See application file for complete search history.

(56) References Cited

U.S. PATENT DOCUMENTS

| 7,103,595 | B2 | 9/2006 | Anastasiadis et al. |
| 7,127,465 | B2 | 10/2006 | Rao et al. |
| 7,139,781 | B2 | 11/2006 | Young et al. |
| 7,454,592 | B1 | 11/2008 | Shah et al. |
| 7,747,663 | B2 | 6/2010 | Atkin et al. |
| 7,814,078 | B1 | 10/2010 | Forman et al. |
| 8,028,106 | B2 | 9/2011 | Bondurant et al. |
| 8,140,625 | B2 | 3/2012 | Dubnicki et al. |
| 8,140,786 | B2 | 3/2012 | Bunte et al. |
| 8,214,406 | B2 | 7/2012 | Kushwah et al. |
| 8,478,799 | B2 | 7/2013 | Beaverson et al. |
| 8,965,854 | B2 | 2/2015 | Provenzano et al. |
| 9,268,969 | B2 * | 2/2016 | Gault ............... G06F 21/60 |

(Continued)

OTHER PUBLICATIONS

Sasha Ames, et al., "Design and Implementation of a Metadata-rich File System," 2012, pp. 1-14. https://www.soe.ucsc.edu/sites/default/files/technical-reports/UCSC-SOE-10-07.pdf.

(Continued)

*Primary Examiner* — Anthony D Brown
(74) *Attorney, Agent, or Firm* — Hewlett Packard Enterprise Patent Department (57) ABSTRACT

In an example, a system may modify an object stored in an object store for storing objects to include augmented metadata. The system may encode a signature of the modified object such that the signature is identical to a signature of the object prior to being modified to include the augmented metadata.

20 Claims, 6 Drawing Sheets

(56) References Cited

U.S. PATENT DOCUMENTS

| | | | |
|---|---|---|---|
| 9,286,320 B2 | 3/2016 | Kanfi et al. | |
| 9,432,192 B1 | 8/2016 | Pogde et al. | |
| 2004/0148306 A1 | 7/2004 | Moulton et al. | |
| 2005/0177750 A1* | 8/2005 | Gasparini | G06F 21/31 726/5 |
| 2005/0289137 A1* | 12/2005 | Wu | G06F 17/24 |
| 2006/0036898 A1 | 2/2006 | Doering | |
| 2012/0151049 A1* | 6/2012 | Carlson | H04L 67/1097 709/224 |
| 2013/0238900 A1* | 9/2013 | Leggette | G06F 11/2069 713/165 |
| 2015/0047049 A1* | 2/2015 | Panchenko | G06F 21/54 726/26 |

OTHER PUBLICATIONS

Zhu et al., "Avoiding the Disk Bottleneck in the Data Domain Deduplication File System", Proceeding FAST'08 Proceedings of the 6th USENIX Conference on File and Storage Technologies, Article No. 18, 2008, 14 pages.
You et al., "Deep Store: An Archival Storage System Architecture", 21st International Conference on Data Engineering (ICDE'05), 2005, 12 pages.
Xie, et al., "Oasis: An active storage framework for object storage platform", Future Generation Computer Systems, vol. 56, Mar. 2016, 14 pages, SimpliVity Exhibit 2007, Springpath v. SimpliVity IPR2016-01779.
Wikipedia: "Object Storage" (available at https://en.wikipedia.org/wiki/Object.sub.—storage) (last visited Dec. 6, 2016), SimpliVity Exhibit 2001, Springpath v. SimpliVity IPR2016-01779, 9 pages.
Wikipedia: "Namespace" (available at https://en.wikipedia.org/wiki/Namespace) (last visited Dec. 6, 2016), SimpliVity Exhibit 2008, Springpath v. SimpliVity IPR2016-01779, 3 pages.
Webster's New World Computer Dictionary, 10th Ed. 2003, 3 pages.
Webopedia: "Namespace" (available at http://www.webopedia.com/TERM/N/namespace.html) (last visited Dec. 20, 2016), SimpliVity Exhibit 2009, Springpath v. SimpliVity IPR2016-01779, 2 pages.
Webopedia: "Inode" (available at http://www.webopedia.com/TERM/I/inode.html) (last visited Dec. 20, 2016), SimpliVity Exhibit 2002, Springpath v. SimpliVity IPR2016-01779, 2 pages.
USPTO PTAB Patent Owner's Preliminary Response dated Dec. 27, 2016, Springpath, Inc. v. SimpliVity Corp., Case IPR2016-01780, U.S. Pat. No. 8,478,799 B2 (SimpliVity Exhibits 2001-2009 identical to IPR2016-01779 and previously submitted), 48 pages.
USPTO PTAB Patent Owner's Preliminary Response dated Dec. 27, 2016, Springpath, Inc. v. SimpliVity Corp., Case IPR2016-01779, U.S. Pat. No. 8,478,799 B2 (SimpliVity Exhibits 2001-2009 listed below), 44 pages.
USPTO PTAB Decision Denying Institution of Inter Partes Review entered Mar. 22, 2017, Springpath, Inc. v. SimpliVity Corp., Case IPR2016-01779, U.S. Pat. No. 8,478,799 B2, 15 pages.
USPTO PTAB Decision Denying Institution of Inter Partes Review entered Mar. 21, 2017, Springpath, Inc. v. SimpliVity Corp., Case IPR2016-01780, U.S. Pat. No. 8,478,799 B2, 15 pages.
USENIX Association, "Proceedings of the First Symposium on Networked Systems Design and Implementation," Mar. 2004, pp. 1-15, San Francisco, CA, USA.
U.S. Patent and Trademark Office Notice of Allowance dated May 29, 2013 in U.S. Appl. No. 12/823,922 (Springpalh Exhibits 1013 & 1113), 12 pages.
U.S. Patent and Trademark Office non-final Office Action dated Aug. 30, 2012 in U.S. Appl. No. 12/823,922 (Springpath Exhibits 1006 & 1106), 32 pages.
U.S. Patent and Trademark Office final Office Action dated Feb. 22, 2013 in U.S. Appl. No. 12/823,922 (Springpath Exhibits 1010 & 1110), 26 pages.
Understanding Object Storage and Block Storage use cases, Jul. 20, 2015 (available at http://cloudacademy.com/blog/object-storage-block-storage/) (last visited Dec. 22, 2016), SimpliVity Exhibit 2005, Springpath v. SimpliVity IPR2016-01779, 9 pages.
U.S. Appl. No. 61/269,633, filed Jun. 26, 2009, 32 pages.
The EMC Centera and TOWER Technology Advantage, EMC White Paper, Jul. 2002, pp. 1-8.
Stevens. et al., "The first collision for full SHA-1," International Association for Cryptology Research 2017, pp. 570-596.
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1.
Simplivity Corporation's Reply Claim Construction Brief, Case 4:15-cv-13345-TSH, Document 132, Jul. 24, 2017, pp. 1-23.
Simplivity Corporation's Opening Claim Construction Brief, Case 4:15-cv-13345-TSH, Document 130, Jul. 10, 2017, pp. 1-21.
SimpliVity Corporation's Markman Hearing Transcript, Case No. 15cv13345-TSH, Aug. 16, 2017, pp. 1-119.
Sang-Won Lee, et al., "A Case for Flash Memory SSD in Enterprise Database Applications," Proceedings of the 2008 ACM SIGMOD International Conference on Management of Data (2008), pp. 1075-1086.
Sandberg et al. "Design and Implementation of the Sun Network Filesystem", Sun Microsystems, Mountain View, CA (12 pp) (Springpath Exhibits 1004 & 1116) Dec. 27, 2016.
Ritchie et al., "The UNIX Time-Sharing System", Communications of the ACM, vol. 17, Jul. 1974, pp. 365-375.
Rhea et al., Fast, "Inexpensive Content-Addressed Storage in Foundation", Proceeding of USENIX 2008 Annual Technical Conference, 2008, 14 pages.
Response to U.S. non-final Office Action dated Aug. 30, 2012 filed Dec. 18, 2012 in U.S. Appl. No. 12/823,922 (Springpath Exhibits 1009 & 1109), 148 pages.
Response to U.S. final Office Action dated Feb. 22, 2013 filed May 8, 2013 in U.S. Appl. No. 12/823,922 (Springpath Exhibits 1012 & 1112), 48 pages.
Ragib Hasan, et al., "A Survey of Peer-to-Peer Storage Techniques for Distributed File Systems," International Conference on Information Technology: Coding and Computing, 2005, 9 pages.
R. Rivest, "The MD5 Message-Digest Algonthm," Request for Comments 1321, Internet Engineering Task Force, CSCO-1017, Apr. 1992, 21 pages.
Quinlan et al., "Venti: a new approach to archival storage", Bell Labs, Lucent Technologies, 1-13 pp (Springpath Exhibits 1008 & 1108).
Prosecution History of the U.S. Pat. No. 8,478,799 patent, 576 pages.
Presentation: "Object Storage technology," Storage Networking Industry Association, 2013 (available at http://www.snia.org/sites/defaull/education/tutorials/2013/spring/file/BrentWelch_Object_Storage_Technology.pdf) (last visited Dec. 22, 2016), SimpliVity Exhibit 2003, Springpath v. SimpliVity IPR2016-01779, 42 pages.
Preliminary information, AMD Athlon, Processor Module Data Sheet, AMD .Athlon, Publication #21016, Rev. M, Issue Date:,Jun. 2000, 74 pages.
Prashant Shenoy, et al., "Symphony: An Integrated Multimedia File System," Proceedings of SPIE 3310, Multimedia Computing and Networking 1998, pp. 124-138.
Prashant Shenoy, "Declaration of Prashant Shenoy. PhD, Under 37 C.F.R. .stcn. 1.68 in Support of Petition for Inter Partes Review of U.S. Pat. No. 8,478,799", dated Aug. 11, 2017, 196 pages.
Petitioner's Reply to Patent Owner's Preliminary Response, Case IPR2017-01933, U.S. Pat. No. 8,478,799, dated Feb. 28, 2018, pp. 1-17.
Petition for Inter Partes Review of U.S. Pat. No. 8,478,799 before the USPTO Patent Trial and Appeal Board dated Sep. 14, 2016, Case IPR2016-01780, 66 pages.
Petition for Inter Partes Review of U.S. Pat. No. 8,478,799 before the USPTO Patent Trial and Appeal Board dated Sep. 14, 2016, Case IPR2016-01779, 59 pages.
Petition for Inter Partes Review of U.S. Pat. No. 8,478,799 filed Aug. 11, 2017, case IPR2017-01933, 92 pages. The citations from PIR2017-01933 are submitted herewith below.

(56) References Cited

OTHER PUBLICATIONS

Patent Owner's Preliminary Response Pursuant to 37 CFR 42.107(a), Case IPR2017-01933, U.S. Pat. No. 8,478,799, dated Dec. 21, 2017, pp. 1-47.
Object Storage versus Block Storage: Understanding the Technology Differences, Aug. 14, 2014 (available at http://www.druva.com/blog/object-storage-versus-block-storage-understandi-ng-technology-differences/) (last visited Dec. 22, 2016), SimpliVity Exhibit 2004, Springpath v. SimpliVity IPR2016-01779, 7 pages.
OBFS: A File System for Object-based Storage Devices, Feng, et al., 2004, SimpliVity Exhibit 2006, Springpath v. SimpliVity IPR2016-01779, 18 pages.
Nitin Agrawal, et al., "Design Tradeoffs for SSD Performance," USENIX'08: 2008 USENIX Annual Technical Conference, Jun. 25, 2008, pp. 57-70.
Microsoft Computer Dictionary, 5th Ed., 2002, 7 pages.
Michele Nelson, "Declaration of Michele Nelson, Under 37 C.F.R .sctn. 1.68", dated Aug. 9, 2017, 92 pages.
Mesnier et al., "Object-Based Storage", IEEE Communications Magazine, vol. 41, Aug. 2003, pp. 84-90.
Mendel Rosenblum, "The Design and Implementation of a Log Logstructuredfile System", Kluwer Academic Publishers, 1995, 3 pages.
Mckusick et al., "A fast file system for UNIX", ACM Transactions on Computer Systems (TOCS), vol. 2, 1984, 14 pages.
Martin Placek, "Storage Exchange: A Global Platform for Trading Distributed Storage Services," Master of Engineering Science Thesis, The University of Melbourne, Australia, Jul. 2006, 185 pages.
Marice J. Bach, The Design of the UNIX Operating System (1986), 8 pages.
Li, et al., "Secure Untrusted Data Repository (SUNDR)", USENIX Association OSDI '04: 6th Symposium on Operating Systems Design and Implementation, Dec. 6-8, 2004, pp. 121-136, (Springpath Exhibits 1003 & 1103).
Levanoni et al., "An On-the-Fly Reference-Counting Garbage Collector for Java", ACM Transactions on Programming Languages and Systems (TOPLAS), vol. 28, 2006, 67 pages.
Kawaguchi et al., "A Flash-Memory Based File System", Proceeding TCON'95 Proceedings of the USENIX 1995 Technical Conference Proceedings, 1995, 10 pages.
Josh Cates, "Robust and Efficient Data Management for a Distributed Hash Table", Jun. 2003, 64 pages.
Joint Claim Construction and Prehearing Statement, Case 4:15-cv-13345-TSH, Document 136, Aug. 7, 2017, pp. 1-8.
Ingrid Hsieh-Yee, "Declaration of Ingrid Hsieh-Yee, PhD, Under 37 C.F.R .sctn. 1.68 in Support of Petition for Inter Partes Review of U.S. Pat. No. 8,478,799", dated Aug. 10, 2017, 77 pages.
IEEE The Open Group, "1003.1 (Trademark) Standard for Information Technology—Portable Operating System Interface (POSIX (R))", Base Specification, Issue 6, IEEE Std 1003.1-2001, Approved Sep. 12, 2001, The Open Group, (Springpath Exhibits 1015 & 1115), 8 pages.
IBM, AIX 5L Version 5.2, "General Programming Concepts: Writing and Debugging Programs", 9th Edition, Aug. 2004, 616 pages.
Hutchinson et al., "Logical vs. Physical File System Backup", Proceedings of the 3rd Symposium on Operating Systems Design and Implementation, New Orleans, Louisiana, February, 1999, 12 pages.
Hitz et al., "File System Design for an NFS File Server Appliance", Technical Report 3002, USENIX Winter 1994—San Francisco, California, Jan. 19, 1994, 23 pages.
Hewlett Packard Enterprise Company's Response to Springpath's Supplemental Claim Construction Brief, C.A. No. 4:15-cv-13345-TSH, dated Oct. 30, 2017, pp. 1-5.
Harel Paz, "Efficient Memory Management for Servers", Research Thesis Submitted to the Senate of the Technion—Israel Institute of Technology, Aug. 2006, 228 pages.
Grembowski et al., "Comparative Analysis of the Hardware Implementations of Hash Functions SHA-1 and SHA-512", Information Security. ISC 2002, Lecture Notes in Computer Science, vol. 2433, 2002, 15 pages.
Garth Gibson, et al., "A Cost-Effective, High-Bandwidth Storage Architecture," Proceedings of the 8th Conference on Architectural Support for Programming Languages and Operating Systems, 1998, pp. 92-103.
Fu et al., Fast and Secure Distributed Read-Only File System, ACM Transactions on Computer Systems, vol. 20, No. 1, Feb. 2002, pp. 1-24.
Fu et al., "Fast and Secure Distributed Read-Only File System", Proceeding OSDI'00 Proceedings of the 4th conference on Symposium on Operating System Design & Implementation, vol. 4, 2000, 16 pages.
Frequently Asked Questions for FreeBSD 2.X, 3.X and 4.X-, unknown date, 8 pages,. ,Achived at https://web.archive.org/web/20020404064240/http://www.freebsd.org:80/doc/en_US.ISO8859-1/books/faq/install.html.
Frank Dabek, "A Distributed Hash Table," Sep. 2005, pp. 1-135, Massachusetts Institute of Technology.
Defendant Springpath, Inc.'s Repiy Claim Construction Brief, Case 4:15-cv-13345-TSH, Document 133, Jul. 24, 2017, pp. 1-17.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Motion for Leave to File Supplemental Claim Construction Brief, Case 4:15-cv-13345-TSH, Document 146, Oct. 17, 2017, pp. 1-5.
Declaration of Darrell D.E.Long, Ph.D. Regarding U.S. Pat. No. 8,478,799 dated Sep. 14, 2016, Case IPR2016-01780 (Springpalh Exhibit 1102), 114 pages.
Declaration of Darrell D.E.Long, Ph.D. Regarding U.S. Pat. No. 8,478,799 dated Sep. 14, 2016, Case IPR2016-01779 (Springpath Exhibit 1002), 109 pages.
Decision Denying Institution of Inter Partes Review, Case IPR2017-01933, U.S. Pat. No. 8,478,799 B2, Mar. 16, 2018, pp. 1-18, USPTO.
Debnath et al., "ChunkStash: Speeding up Inline Storage Deduplication using Flash Memory" 2010 USENIX Annual Technical Conference (ATC), 2010, 16 pages.
David Bader, "Declaration of David Bader, Under 37 C.F.R. .sctn. 1.68", dated Aug. 10, 2017, 31 pages.
Dabek et al., "Wide-area cooperative storage with CFS," Operating Systems Review—Proceedings of the 18th ACM Symposium on Operating Systems Principles (SOSP'01), vol. 35, No. 5, 2001, pp. 202-215.
Cox et al., "Pastiche: Making Backup Cheap and Easy", ACM SIGOPS Operating Systems Review—OSDI '02: Proceedings of the 5th Symposium on Operating Systems Design and Implementation, vol. 36, 2002, 14 pages.
Chaves et al., "Cost-Efficient SHA Hardware Accelerators", IEEE Transactions on Very Large Scale Integration (VLSI) Systems, vol. 16, No. 8, Aug. 2008, pp. 999-1008.
Byung-Gon Chun, et al., "Efficient Replica Maintenance for Distributed Storage Systems," USENIX Association, Proceedings of NSDI '06: 3rd Symposium on Networked Systems Design & Implementation, 2006, pp. 45-58.
Bruce Schneier, "Applied Cryptography, 2d Ed, Protocol, Algorithms, and Source Code in C", John Wiley & Sons, Inc., 1996, 4 pages.
Bruce Eckel, "C++ Inside & Out", 1992, 6 pages.
Boehm et al., "Garbage Collection in an Uncooperative Environment", Software—Practice & Experience, vol. 18, Sep. 1988, 17 pages.
Bobbarjung et al., "Improving Duplicate Elimination in Storage Systems", ACM Transactions on Storage, vol. 2, 2006, 23 pages.
Bibliographic Record Information, "The Design and Implementation of the FreeBSD Operating System", 2005, available at the online catalog of the Library of Congress, accessed Aug. 3, 2017, 2 pages.
Bibliographic Record Information for Operating Systems Review—Proceedings of the 18th ACM Symposium on Operating Systems (56) References Cited

OTHER PUBLICATIONS

Principles (SOSP'01), 2001, available at the online catalog of the Library of Congress, accessed Jul. 31, 2017, 3 pages.

Best, et al., "How the Journaled File System handles the on-disk layout", May 2000, IBM: developerWorks: Linux library/Open source library Internet download Apr. 18, 2001; http://swgiwas001.sby.ibm.com/developerworks/library/jfslayoul/Index1.html (Springpath Exhibits 1011 & 1111), 30 pages.

Athicha Muthitacharoen, et al., "Ivy: A Read/Write Peer-to-Peer File System" Proceedings of the 5th Symposium on Operating Systems Desing and Implementation (OSDI '02), Operating Systems Review, vol. 36, Issue SI (Winter 2002), 21 pages.

Andrew S. Tanenbaum, "Modern Operating Systems", 2d Ed., 2001, 7 pages.

AMD Athlon (Trademark), "Processor Quick Reference FAQ", Feb. 3, 2000, 12 pages.

Alan Freedman, "Computer Desktop Encyclopedia", 9th Ed., Osborne/McGraw-Hill, 2001, 7 pages.

AIX 5L Version 5.2 System Management Concepts: Operating System and Devices, May 2004, 7th ed., IBM, pp. 1-190.

Abd-El-Malek et al., Ursa Minor: Versatile Cluster-Based Storage, Proceeding FAST'05 Proceedings of the 4th conference on USENIX Conference on File and Storage Technologies, vol. 4, 2005, 14 pages.

"Curriculum Vitae of Dr. Prashant Shenoy", 2017, 31 pages.

"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.

"AMD Athlon Processor", ADM Technical Brief, Publication # 22054, Rev. D, Issue date Dec. 1999, 10 pages.

\* cited by examiner

```
DETERMINE THE HIERARCHICAL DISTANCE OF THE AFFECTED
OBJECT FROM THE ROOT OBJECT
604
              │
              ▼
DETERMINE THE OFFSET ADDRESS OF THE INTERMEDIATE OBJECT
BETWEEN THE ROOT OBJECT AND THE CERTAIN OBJECT
606
              │
              ▼
DETERMINE WHETHER THE INTERMEDIATE OBJECT IS AT THE
DETERMINED HIERARCHICAL DISTANCE
608
              │
              ▼
IN RESPONSE TO A DETERMINATION THAT THE INTERMEDIATE
OBJECT IS AT THE DETERMINED HIERARCHICAL DISTANCE,
DETERMINE THE OFFSET ADDRESS OF THE AFFECTED OBJECT
610
```

FIGURE 6

AUGMENTED METADATA AND SIGNATURES FOR OBJECTS IN OBJECT STORES

BACKGROUND

File systems are used to control how data is stored and retrieved. The file system allows differentiation of information placed in a medium. One method of differentiating the information on a medium is to separate the data into pieces and to give each piece a name. There are different kinds of file systems having different structures, logic, properties of speed, flexibility, security, size and the like. File systems may be implemented on one or more nodes of a federated system of nodes.

Federated systems are a collection of nodes. In an example, the nodes may act in a peer-to-peer network without a centralized authority. In a decentralized network, peers communicate among themselves to resolve state. The nodes in the federated system may communicate with each other regarding the underlying state including the state of the file system.

BRIEF DESCRIPTION OF DRAWINGS

Examples are described in detail in the following description with reference to the following Figures. In the accompanying Figures, like reference numerals indicate similar elements.

DETAILED DESCRIPTION OF EMBODIMENTS

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well-known methods and/or structures have not been described in detail so as not to unnecessarily obscure the description of the embodiments and examples described herein.

According to an example of the present disclosure, a system may store augmented metadata in an object stored on an object store such that a signature of the object with the augmented metadata and a signature of the object without the augmented metadata are identical. The signatures of the object and the object with the augmented metadata may be identical when the signature is calculated before the object is modified to include the augmented metadata or when the signature is calculated ignoring the augmented metadata.

Examples of augmented metadata include an offset address from a starting address where an object is stored in a persistent storage, date of modification of an object, date of creation of an object and the like. In an example, storing the offset address in the augmented metadata of a parent object of the object allows faster retrieval of the object. In an example, the starting address may indicate a certain sector of a solid-state drive (SSD) where the object is stored. In another example, the starting address may indicate a starting address of a certain SSD in a plurality of SSDs. In an example, the system may store localized metadata for an object in its augmented metadata. For example, the system may store a reference count associated with the object in that object's augmented metadata. In another example, the system may store a reference count associated with the object in a parent object's augmented metadata.

In an example, the system may encode the contents of an object using a cryptographic function to determine the signature unique to that object. A change in the contents of the object may change the signature of that object. In an example, the object store may use a cryptographic digest or a signature for an object to identify the object in the object store, wherein each object in the object store exhibits a hierarchical relationship from a root object ending in child objects located furthest from the root object. Each signature in the object store is globally unique, meaning that the identifier is unique across all nodes in an object store. In an example, unique may mean the probability of collision between signatures is astronomically small. For example, using an ideal cryptographic function with the output size of n, where there are p objects then the possibility of collision is $p^2/2^{n+1}$ provided p is smaller than $2^{n/2}$. For example, with SHA-256 (n=256) and one billion objects ($p=10^9$) the probability of collision is $4.3\times10^{-60}$. The object store may be a virtual layer storing the objects and may be present on a node or nodes of a federated peer-to-peer network of nodes. The object stores may manage and store objects on persistent storage on a node. Examples of persistent storage may include SSD, Non-Volatile Memory (e.g., NVMe), Hard Disk Drives, memristor, OPTANE™ or the like. The object signature allows storing an object once in persistent storage, i.e., avoiding duplicates, using the object store to map object signatures to object data through access to an object index and the persistent media where the data is stored. In examples, the system may store an object once to avoid duplication. The system may avoid duplication of the object globally across the nodes of the object store. However, the system may store the same object more than once for redundancy, backup and/or faster access to other nodes such as a remote network node or backup node colocated next to a node. For example, the object store may replicate objects at a remote site periodically for disaster recovery. However, the object signature reduces data storage through deduplication. For example, virtual machines may run instances of operating systems, and the virtual machines may be stored on the nodes. The common components of the operating systems may be stored once in one or more objects in a node. Running multiple virtual machine instances may save space by reusing the objects on the node.

The physical address where an object is stored in a persistent storage is often determined by factors outside the control of the object store. For example, an SSD drive controller may determine the physical address. In another example, an object deleted on the object store may have been garbage collected in one peer, whereas the object may not have been garbage collected in another peer. This may result in a different physical address where the object is stored. In an example, a physical address on an SSD drive may be damaged causing it to be changed. The physical address where an object is stored may vary even at different points in time within the same system based on different factors. Therefore, including the augmented metadata when generating a signature may result in different signatures based on the physical address for objects with otherwise identical contents.

In an example, the system may encode the signature of the object before modifying the object to include the augmented metadata without modifying the signature. Thus, the encoded signature uniquely identifies the object even when the offset address from a starting address where the object is stored changes. In an example, a federated peer-to-peer network of nodes may store objects. Restoring an object from a second peer may result in a restored object (e.g., restored from a failsafe storage) without the augmented metadata. In another example, while synchronizing objects stored in the federated peer-to-peer network of nodes, the augmented metadata may not affect the synchronization of the object. The same object may not occupy the same physical address or memory offset in the persistent storage on the first and the second peer. The second peer may store the object in its local persistent storage during synchronization. The second peer may generate an augmented metadata for the object based on the local physical offset or memory in its local persistent storage.

In an example, the system may ignore the augmented metadata in an object when determining the signature of the object. For example, the system may verify whether the retrieved object contents match the signature. The system may ignore the augmented metadata while determining whether there is a match. In an example, the system may generate a parent object with an augmented metadata. Subsequently the system may generate the signature based on the contents of the parent object by ignoring the augmented metadata. For example, the system may determine the signature of the parent object by including a first 1 kibibyte (KiB) of metadata, and ignoring a second 1 KiB of augmented metadata while determining the parent signature. For example, the first KiB includes the signature of a child object of the parent. The parent object's signature is calculated using the contents of the parent object, including the signature of the child object. However, the second 1 KiB of augmented metadata, which includes the child object's address on a local persistent storage, is ignored when calculating the signature of the parent object.

In an example, the system may include a child object's signature in the contents of a parent object of the child object. A grandparent object of the child object may include a signature of the parent object. Each intermediate object between the child object and the root object includes the signature of the intermediate object's child object. In an example, one or more objects in the object store may exhibit a relationship described by a directed acyclic graph (DAG). For example, a DAG may include objects such as the root object, and a hierarchy of objects below the root object ending in one or more leaf objects. The DAG may include many vertices (objects) and edges (links between objects), with each edge directed from one vertex to another such that there is no way to start at any random vertex and follow a consistently directed sequence of edges that eventually loops back to the random vertex again. Also, the DAG may include a topological ordering and a sequence of vertices such that every edge is directed from an earlier vertex to a later vertex in the sequence. In an example, the DAG may be a blockchain storage. The blocks in the blockchain may be the vertices and the edges may be the last block of the blockchain or may be abandoned chains in the blockchain such as forks. In an example, the DAG may include a root object that includes the signature of a child object, the child object in turn including the signature of its child object and so on ending in a leaf object (an object with no child object). The objects may thus have a hierarchical structure where the topological ordering is directed from the root leaf object to the farthest child object or leaf object (including the root object) in the sequence. Examples of DAG's may include blockchains or trees. In an example, an object store may store one or more objects that are related to each other in the form of a Merkle tree or a modified Merkle tree. In another example, the object store on each node may include objects that form one or more DAGs. For example, a node may store a DAG to backup the current state of an object, and store changes as a new DAG to switch between the current state and the previous state of the object store.

According to an example of the disclosure, the system may modify contents of a parent object in the object store to include augmented metadata. The system may persist the modified parent object to a persistent storage. The system may then modify, i.e., augment the object record of the parent object with the physical address where the modified object is stored. In an example, the system may allow the signature of the parent object to remain unmodified, i.e., the system may treat the parent object and the modified parent object as identical objects with the augmented metadata. The system may treat the modified parent object and the parent object as identical by using the same signature for the modified parent object with the augmented metadata and the parent object prior to modification. In an example, the system may generate the parent object instead of rewriting the parent object to avoid write amplification on certain persistent storage such as an SSD. The system may remove the parent object without the augmented metadata to save space.

In an example, the system may retrieve a certain object stored in the object store. The system may receive an input output (I/O) operation to retrieve a certain object stored on the object store. The system may determine a hierarchical level and an offset on the hierarchy from the root object where the certain object is placed in the object store. The system may then determine the offset address where the certain object is stored in the persistent storage. In an example, the system may determine the offset address where the certain object is stored from a parent object of the certain object. The system may identify the parent object located at n−1 from the determined hierarchical level, where n is the determined hierarchical distance of the certain object from the root object. The system may also determine an offset for the certain object from the root object. The system may determine the offset address of the root object from an object index. Also, the system may use the signature of the root object to traverse from the root object to a leaf object on the object store.

In an example, the system may determine an offset address of the certain object based on augmented metadata stored in the root object, without accessing the object index to determine the offset address of objects other than the root object. The system may access the offset address of objects from augmented metadata stored in objects in the hierarchy between the root object and the certain object, instead of looking up the offset address of intermediate objects in the object index for intermediate objects located between the certain object and the root object. The system may determine the offset address of intermediate objects from the augmented metadata of an intermediate object's parent.

In an example, the root object may include the signature of the child object. The root object may also include augmented metadata. In an example, the augmented metadata may associate the signature of the child object with an offset address in persistent storage where the child object is stored. The system may determine the offset address in the persistent storage where the child object is stored without accessing the object index.

In an example, the system may retrieve the offset addresses of intermediate objects between the root object and the determined hierarchical level until the system retrieves an intermediate object which is an immediate parent of the certain object. The system may determine the physical storage address of the certain object from the parent object. In an example, the system may retrieve the certain object, modify the certain object to remove the augmented metadata, and synchronize the certain object between peers in a federated peer-to-peer network or the like. For example, the system may synchronize the modified object between an object store on a first peer and an object store on a second peer in the federated peer-to-peer network.

A technical problem associated with accessing an object in the object store is the number of lookups used to retrieve a certain object stored in the object store. For example, an expensive technique in terms of number of lookups may include retrieving the offset addresses of each intermediate object between a root object and the certain object from the object index. The system according to an example of the disclosure may provide augmented metadata with the offset address where the child object of a parent object is stored, where the child object and the parent object are separated by a hierarchical distance of one. The system may thus avoid expensive (in terms of system resources) lookups of the object index for addresses of objects other than the address of the root object. Reducing the number of lookups may reduce system resource utilization such as Central Processing Unit (CPU) utilization, Random Access Memory (RAM) utilization and the like. Also, reducing lookups may increase the number of Input/Output Operations per second (IOPS) of the persistent storage.

Another technical problem associated with object store is the difficulty of storing local node-specific information associated with an object in the object store. An object in the object store is identified based on a signature determined according to the contents of the object. Including local node-specific information in an object in the object store may lead to a mismatch between signatures of the object, due to various factors. The system according to an example of the disclosure may prevent the mismatch between a signature on a first node without the augmented metadata and a signature on a second node with the augmented metadata using object signatures that are not altered by the augmented metadata. For example, the system may determine the signature according to the cryptographic function (e.g., by calculating the hash using the cryptographic function) before modifying the object to include the augmented metadata. In an example, the system may ignore the augmented metadata to calculate the signature according to the cryptographic function.

Another technical problem with including augmented metadata with a signature is synchronizing an object with the augmented metadata between nodes in a peer-to-peer network. According to an example of the disclosure, the system may synchronize the object across the peer-to-peer network because the signatures are identical for objects with the augmented metadata and for objects without the augmented metadata having the same contents other than the metadata.

Figure 1:
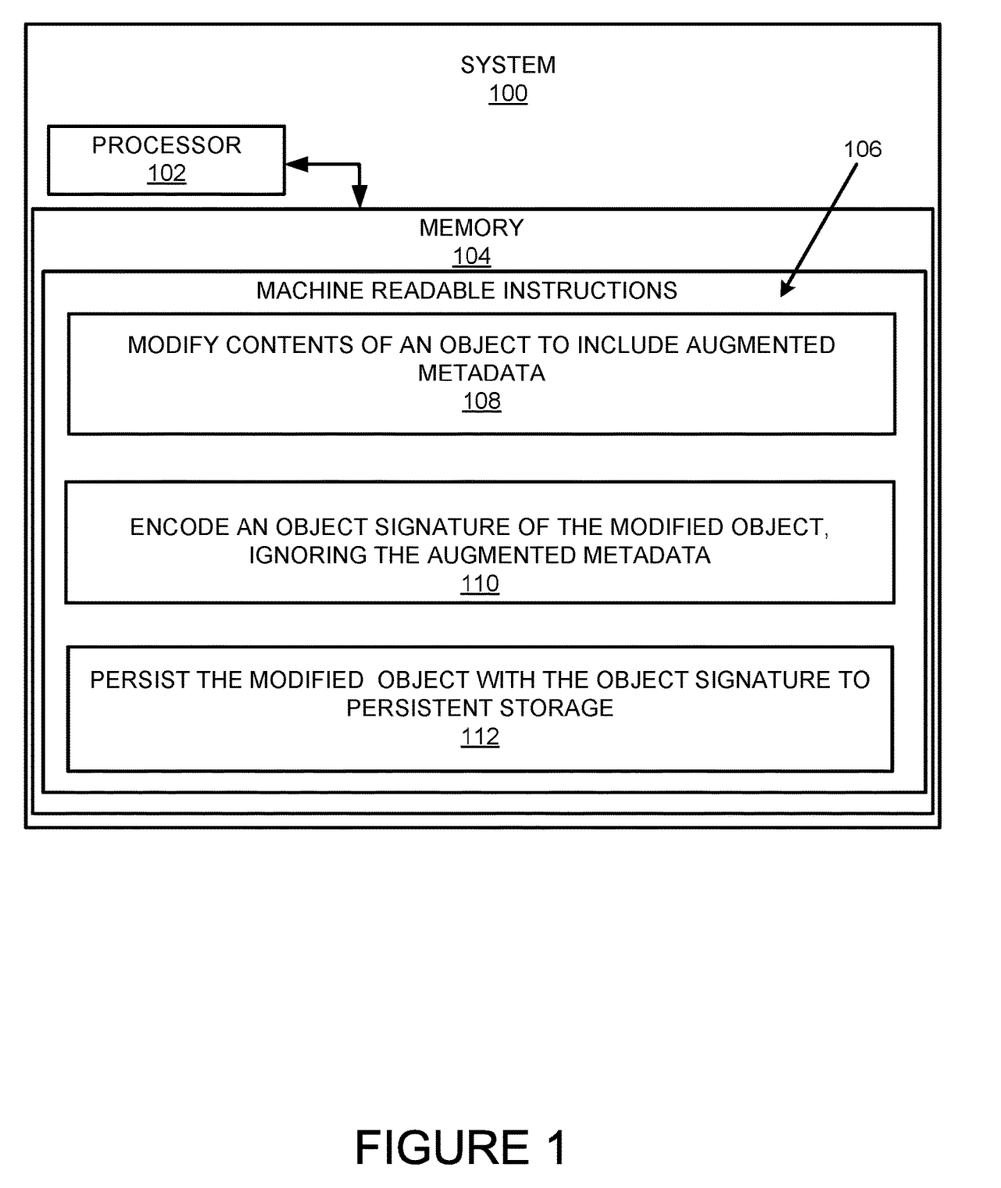
FIG. 1 illustrates an example of a system for adding augmented metadata to an object in an object store.

FIG. 1 shows an example of a system 100 for generating, accessing and maintaining an object with augmented metadata, and associating the object with a signature that ignores the augmented metadata. The system 100 may include a processor 102 and a memory 104. The system 100 may include machine readable instructions 106 stored in the memory 104 or another type of non-transitory computer-readable medium. In an example, the system 100 may include a node, wherein the node has a persistent storage accessible through an object index and an object store located on a node. In another example, the system 100 may include networked nodes, wherein one or more nodes have a persistent storage accessible through an object store and an object index. In an example, the system 100 may include instructions in a non-transitory computer-readable medium executable by a processor on a peer (e.g., node). Each node may be implemented on servers, computers, virtual hosts, specialized hardware, a hybrid of servers and/or specialized hardware. The servers may include a processor, memory, persistent storage, a bus, a network adapter and the like. The persistent storage including persistent media may store objects in the object store. The system 100 may use the object store to store objects on the persistent storage. For example, the object store may be located on a node in a peer to peer network of nodes. In an example, the object store may be based on globally unique signatures generated using a cryptographic function. For example, creating a new object creates a signature for the new object by hashing the new object according to a cryptographic function. Modifying an existing object on the object store creates a new signature for the modified object. In an example, the system 100 may store the first object with the augmented metadata and a second object without the augmented metadata concurrently. The system 100 may use both objects but the first object with the augmented metadata allows for faster retrieval of objects.

An object stored in the object store may include data and/or metadata. In an example, the system 100 may use an object record that associates the signature of an object according to the cryptographic function with an address storing the object in persistent memory. The system 100 may generate an object index with the object records of all objects in the object store. In an example, the object index may map to the object a reference count of the object. In an example, the object record may map to a physical address where the object is stored.

The system 100 may according to an example of the present disclosure generate an object in the object store that includes augmented metadata, with a signature associated with the object that identifies the object based on content of the object other than the augmented metadata. In an example, the augmented metadata of a parent object may store an offset address from a starting address. The starting address may be an address of a physical location of the persistent storage where the child object is persisted.

In an example, the system 100 may store augmented metadata in an object, so that a signature of the object with the augmented metadata and a signature of the object without the augmented metadata are identical. In an example, the system 100 may ignore the augmented metadata when generating the signature of the object including the augmented metadata. In an example, the system 100 may determine the signature of the object before modifying the object to include the augmented metadata for storage.

The system 100 may ignore the augmented metadata while determining the signature. In an example, the system 100 may store 2 KiB of metadata that includes the augmented metadata for an object. The first 1 KiB of the metadata may store the signature of a child object of the object. The second KiB of the metadata may store augmented metadata. The system 100 may ignore the second KiB that includes the augmented metadata while encoding the signature of the object according to the cryptographic function. In an example, the system 100 may avoid looking for the information in the object index from persistent storage when the augmented metadata is available.

For example, the system 100 may retrieve a certain object stored in the object store. Assume in this example, the augmented metadata stores the offset address of a child object in the object store. For example, the system 100 may retrieve the certain object through the root object. The system 100 may use augmented metadata of the root object to locate an intermediate object based on the offset address in augmented metadata, and retrieve intermediate objects between the root object and the certain object. In an example, the system may avoid looking up the object record or the object index when the augmented metadata is available in an intermediate object. In an example, the system may look up the object record or the object index when the augmented metadata is not available in an intermediate object.

In some cases, the object with the augmented metadata may be replaced with an object without the augmented metadata. This replacement may result in an increase in lookups in the object index. For example, during recovery from a crash on a peer in a federated object store, the system 100 may replace objects on a peer that has crashed with objects from a backup peer. The replaced objects may not include the augmented metadata. For example, during recovery of the crashed peer, getting the peer back up with a complete set of objects may be prioritized over faster retrieval using augmented metadata. The system 100 may subsequently rebuild objects with the augmented metadata based on the usage. For example, the system 100 may modify a frequently used object with the augmented metadata. Modifying the frequently used object with the augmented metadata may increase the efficiency of system by reducing the lookups. Thus, the system 100 may augment the stored objects with augmented metadata incrementally. Different sizes of the metadata may be used in a similar manner in different examples.

In an example, the system 100 may determine augmented metadata for an object by determining the offset address of the object in persistent storage. In an example, the system 100 may receive this information from a volume manager of the persistent storage on a local node. In an example, the augmented metadata may include information about the date of creation of a child object, the date of modification of a child object and the like.

The machine-readable instructions 106 may include instructions 108 to modify contents of an object to include augmented metadata. In an example, the augmented metadata of a parent object may include the address of a child object of the parent object. In an example, the augmented metadata of an object may include the time of creation of the object, the time of modification of the object, the parent object of the object and the like. The system 100 may modify the contents of the object before encoding the signature or after encoding the signature as discussed below with reference to instructions 110.

The machine-readable instructions 106 may include instructions 110 to encode a signature of the object while ignoring augmented metadata of the object. For example, the signature of the child object may be included in the object before generating a signature of the object according to the cryptographic function. Then, the instructions 110 may modify the object to include the augmented metadata, without regenerating the signature of the object.

In another example, the system 100 may include the signature of the child object and the augmented metadata in the object, before generating the signature of the object. The system 100 may ignore the augmented metadata while generating the signature. For example, the system 100 may use a first 1 KiB of metadata to store the signature of the child object and a second 1 KiB of metadata for the augmented metadata. The system 100 may determine the signature of the object by ignoring the second 1 KiB of the metadata. In other examples, different sizes for the metadata and augmented metadata may be used.

In an example, the instructions 106 may include instructions 112 to persist the modified object with the signature to the persistent storage. In an example, persisting the modified object may mean storing the parent object at a physical location on a persistent storage device. In an example, persisting the modified object may include storing an object record or updating an object index. The instructions 112 may generate an object record for the modified parent object with the encoded signature and the address where the modified parent object is stored in the persistent storage. In an example, the instructions 112 may update an object index with the object record.

In an example, the instructions 112 may modify an existing object record, to indicate the address where the modified object is stored, while retaining the signature in the existing object record. In an example, the instructions 112 may modify the object record of an object to update the offset address where the modified object is stored. Thus, the signature of the object with the augmented metadata and the signature of the object without the augmented metadata are identical.

In an example, the system 100 may not store a certain object based on a determination that the system 100 includes an object with the signature that is identical to the certain object. The system 100 may treat the certain object without the augmented metadata as identical to an object in persistent memory with the augmented metadata. Thus, the system 100 may store transient information in the augmented metadata, and de-duplicate objects based on contents other than the transient information.

In an example, the system 100 may modify an object to include augmented metadata and persist the modified object to persistent storage. In an example, the system 100 may determine whether the modified object is a child object located at a hierarchical distance greater than two from the root object. In response to a determination that the modified object is located a hierarchical distance greater than two from the root object, i.e., the parent object of the modified object is not the root object, the system may determine an intermediate object at a first hierarchical distance of n−1 from the modified object, where n is the distance between the modified object and the root object. The intermediate object may be located between the modified object and the root object. The system 100 may modify the content of the intermediate object to include the augmented metadata including a physical offset of the modified object. The system may encode the signature for the modified intermediate object ignoring the augmented metadata. The system 100 may persist the modified intermediate object to persistent storage. In an example, the instructions may continue to process other intermediate objects at a second hierarchical distance between m−1 and 1, where m is the distance between the modified intermediate object and the root object, until the root object is reached. The root object is modified to include augmented metadata with an offset address, and the root object is encoded according to the cryptographic function and persisted to persistent storage.

Figure 2:
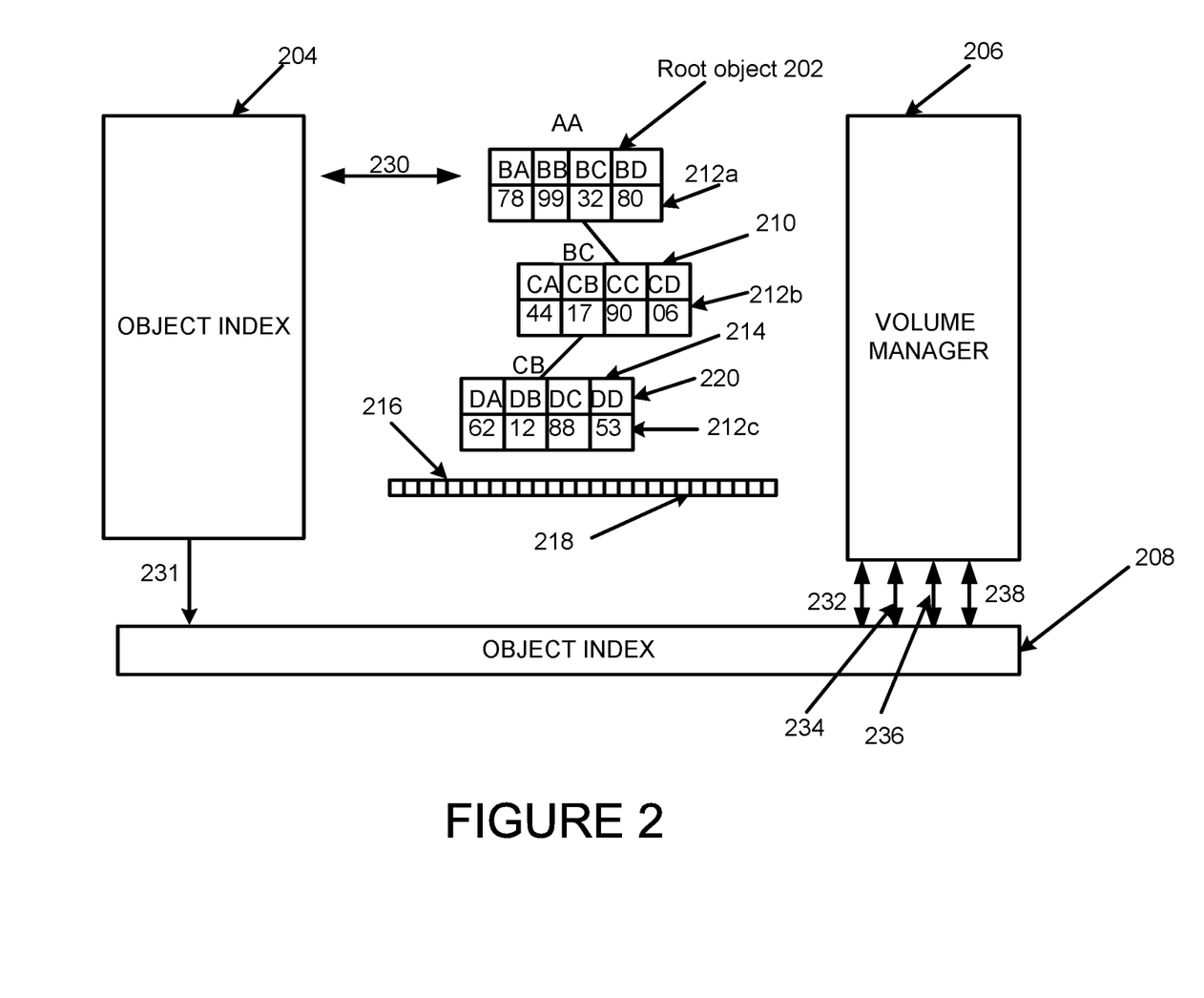
FIG. 2 illustrates an example of retrieving an object using augmented metadata stored in objects in an object store.

Referring to FIG. 2, the figure illustrates retrieval of an object stored in an object store according to an example. The illustration of FIG. 2 may be performed by system 100, as described below. In an example, a node in a system of federated nodes may store an object in an object store with a root object 202, an object index 204, a volume manager 206 and a persistent storage 208. In an example, the contents of the root object 202 may include the signature of its children such as an intermediate object 210 at a hierarchical distance of one below the root object 202 and other children located at the same hierarchical distance. The root object 202 may be identified by the signature AA generated based on the contents of the root object 202. In an example, the root object 202 may include the signatures BA, BB, BC and BD of child objects. The root object 202 may include augmented metadata 212a. In an example, the augmented metadata may include the offset address in persistent storage 208 where a child object is stored. In FIG. 2, the augmented metadata may be collectively referred to as 212, and referred to individually as 212a, 212b, 212c and the like. For example, in FIG. 2 the first intermediate object 210 with the signature BC is stored at the offset address 32. In an example, the augmented metadata 212 may store any metadata that may not be the same between a first peer and a second peer in the federated peer-to-peer network, which is further described with reference to FIG. 3. Also, in some examples, the augmented metadata 212 may include the time of creation of an object, time of modification of the object and the like. The first intermediate object 210 may include the signature of the second intermediate object 214 with the signature CB. In an example, the first intermediate object 210 may include the signatures CA, CC and CD of other child objects in addition to the signature of the child object CB. Like the root object 202, the first intermediate object 210 and the second intermediate object 214 may include augmented metadata 212b, 212c and the like. The system 100 may store an object record in the object index 204 that associates the signature AA of the root object 202 with a physical address of the root object 202 in the persistent storage 208. Similarly, the object index 204 may include object records for intermediate objects 210 and 214.

Figure 3:
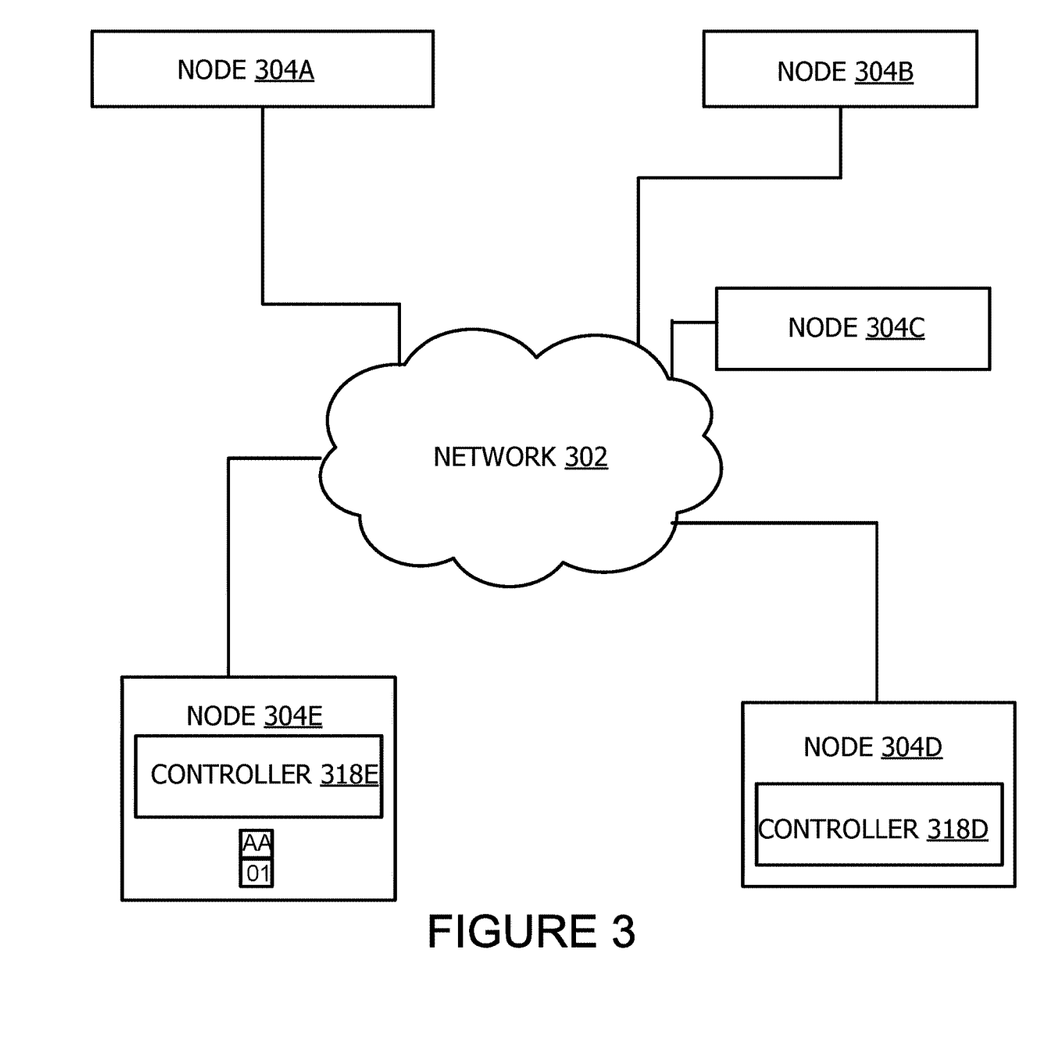
FIG. 3 illustrates a federated peer-to-peer network of a plurality of peers storing objects with augmented metadata in the object store according to an example.

The system 100 may retrieve a certain object, e.g. object 220 from the object store. For example, assume the system 100 receives a request to access the object 220. In an example the system 100 may not know the object signature DD of the object 220 as shown in FIG. 3. The system 100 may determine the signature of the object 220 by traversing the object system as shown by the numbers 230, 231,232, 234, 236 and 238. In an example, the system 100 may determine whether the object 220 is present in an object cache as shown in 230. In response to a determination that the object 220 is not present in the object cache, the system 100 may determine the certain object is not cached. The system 100 may retrieve the certain object through the root object 202 because objects in the object store exhibit a hierarchical relationship from the root object 202.

The system 100 may determine the location where the root object 202 is stored from the object index 204. In another example, the system 100 may retrieve the root object 202 from the object cache. In the alternative, the system 100 may retrieve the root object's 202 signature from the persistent storage 208 for that node as shown by 231. The system 100 may use the volume manager 206 to retrieve the root object 202. The system 100 may determine the hierarchical level or hierarchal distance and the offset, where the certain object is in the hierarchy from the root object. For example, the system 100 may determine the certain object is located at a hierarchical distance of three from the root object 202. The system 100 may also determine the starting address 216 in a block of the physical storage where the certain object is stored. In an example, the starting address 216 may be the address of the root object. In another example, the starting address 216 may be the address of the first object at a certain hierarchical level. In an example, the system 100 may determine the certain object is stored with one or more objects at a hierarchical distance of three at the memory block starting with the starting address 216. The system 100 may determine an offset address 218 of the certain object through the root object 202.

Assume the augmented metadata, 212a, 212b, 212c and the like, includes the offset address where a child object of the object is stored in physical memory. In FIG. 2, the augmented metadata is shown with offsets from a starting address, e.g., starting address 216 for the object 220.

The system 100 may identify the address where the intermediate object 210, e.g., a child object of the root object 202, is stored from the augmented metadata 212a of the root object 202. The system 100 may determine the offset address of the intermediate object 210, e.g., child object of the root object 202, without accessing the object index 204 using the augmented metadata in the root object 202. The system 100 may then determine whether the hierarchical distance is equal to the determined hierarchical distance. In response to a determination that the hierarchical distance is equal to the determined hierarchical distance, the system 100 may determine the offset address of the certain object, e.g., object 220. The system 100 may retrieve the object 220 from the object store, i.e., persistent storage 208 as shown by 232 for that node. In an example, the system 100 may determine the hierarchical distance is not equal to the determined hierarchical distance. The system 100 may retrieve an address of the object 214 from augmented metadata 212b of object 210. The system 100 may determine the address of the object 214 without accessing the object index 204. The system 100 may then determine whether the hierarchical distance of the object is the same as the determined hierarchical distance. In response to a determination that the hierarchical distance is the same as the determined hierarchical distance, the system 100 may obtain the offset address 218 of the object 220 from the starting address 216. The system 100 may use the augmented metadata of the second intermediate object 214 to determine the offset of the object 220 as shown by 234. In the Figure, the certain object has the signature DD and is located at an offset of 53 from the starting address 216. Thus, the system 100 may use the augmented metadata 212a, 212b and 212c as a cache to speed up access to the object and avoid looking up the physical offset for each object in the object index 204, and instead use the volume manager 206 to retrieve the object directly as shown in 232, 234, 236 and 238.

In an example, the system 100 may determine the signature of the root object 202 according to the cryptographic function without including the augmented metadata 212a. In an example, the system 100 may modify the root object 202 to include the signature of its child object, e.g., the object

210. The system 100 may encode the signature, e.g. AA of the root object. The system 100 may store the encoded signature in the object index 204. In an example, the system 100 may determine the signature of the root object in the object index 204, before modifying the root object to include the augmented metadata 212*a*. In another example, the system 100 may update an object record in the object index 204 with the new physical address where the modified root object AA is stored without modifying the signature. In an example, the system 100 may determine the signature of an object such that the signature of the object with the augmented metadata and the signature of the object without the augmented metadata are identical. For example, the system 100 may determine the signature of the object ignoring the augmented metadata.

The system 100 may then synchronize an object between an object store on the first peer and an object store on the second peer on the federated peer-to-peer network without a mismatch. In an example, the system 100 may store any metadata that is local to a peer such as an offset address 218 from a starting address 216 where an object is stored in persistent storage in the augmented metadata 212*a*, 212*b*, 212*c* and the like. In an example, the system 100 may cache any metadata that may increase the system resource utilization in the augmented metadata.

In an example, the system 100 may restore an object from an archive without the augmented metadata 212*a*, 212*b*, 212*c* and the like. The system 100 may retrieve the certain object for objects without the augmented metadata. The system may use the object index 204 when the augmented metadata is not available for an object. The objects with and without the augmented metadata may thus be used interchangeably.

FIG. 3 depicts an example of the system 100 implemented as a federated system of nodes according to an example. The nodes 304 shown as 304A, 304B, 304C, 304D and 304E may interact through a network 302. The network 302 may be any network such as a local area network, wide area network. In an example, the network may be a wireless network such as a microwave link, satellite link, cellular link, laser link, fiber optic linked. In an example, the nodes may be collocated within the same facility. In other examples, the nodes may be in distinct geographical locations. The nodes 304 (collectively referred to as 304 and individually as node 304A, 304B, 304C, 304D and the like) may include controllers 318 (collectively referred to as 318 and individually referred to as the controller 318D, 318E and the like) to communicate with other nodes. In an example, the controllers 318 may be implemented as a virtual controller, a hardware controller or a hybrid.

In an example, the controllers 318 (e.g., 318E and 318D) may use a namespace layer to manage and maintain the object store. The controllers 318 may administer the object store on the peer or node. The controllers 318 may also communicate with other peers through the network 302, for example to generate redundant backups, for faster access to the objects and the like. The figure also shows the node 304E with the root object 202 with an augmented metadata such as an offset, e.g. 01. The system 100 may use the offset of the root object 202, e.g., 01 to access child objects. The nodes 304 may include their own persistent storage. The controllers 318 may synchronize the objects with augmented metadata, local to the node or peer, by ignoring the augmented metadata. The controllers 318 may also restore objects from other peers during failure while ignoring the augmented metadata.

In an example, the controller 318E of node 304E may modify a certain object, e.g., 210 (shown in FIG. 2), in the object store to include the signature of its child object, e.g., 210. The controller 318E may then determine the signature of the object 210. The controller 318E may then modify the object 210 to include the augmented metadata 212*b* as described above with reference to FIG. 2. The controller 318E may persist the modified object to the persistent storage 208. In an example, the controller 318E may update the object record of the object 210 in the object index 204 without updating the signature of the modified object.

Assume the second intermediate object 214 (shown in FIG. 2) is updated to include the augmented metadata 212*c* which did not exist earlier on a peer. A node such as node 304E may update the object index 204 with the new physical address where object with signature CB is stored. The node 304E may generate an intent to indicate the object with signature CB has been modified. In an example, an intent may be an intermediate flag used by the node 304E to track changes before they are persisted to the persistent storage. The node 304E may use the intent to access objects with the modifications when objects with intents are accessed before they are persisted on persistent storage. The node 304E may identify the modified object and the second intermediate object 214 without the augmented metadata 212*c* with the same signature CB. For example, using the augmented metadata 212*b* may decrease the system resource utilization when accessing the child object with the signature CB.

In an example, the node 304E may have a policy requiring redundant backups to node 304D. In other examples, the nodes 304C and 304B may serve as storage locations that may be utilized based on availability or policy settings on the nodes or systems accessing the nodes. The controller 318E may communicate with the controller 318D to synchronize the objects in the object stores located the nodes 304E and 304D. The objects in the nodes 304 E and 304D may be stored in their own persistent storage such as an SSD. The signature of objects such as 202, 210, and 214 are generated based on the contents of the objects. In an example, the controller 318E and controller 318D may synchronize the object store on 304D with a DAG that includes the root object 202 with an object store on 304E with a DAG stored on the node 404D. On the nodes 304D and 304E the object may be stored at different address locations on the persistent storage of the nodes 304D and 304E. In an example, the DAG may be a set of objects associated with a virtual machine and which have a hierarchical relationship from the root object of the DAG.

In an example, the controller 318E and 318D may synchronize the storage of objects in the object stores of the nodes 304E and 304D. For example, during backup operations, the controller 318E may transmit to controller 318D digests of objects in the object store such as the signature of a root object and the root object. In an example, the signature of the root object represents or refers to a snapshot of the entire file system. The node 304D may use the signature of the root object and the root object contents received from node 304E to determine the changes in the files.

The controller 318E may also commit the objects with the augmented metadata to persistent storage. Persistent storage may be any media including hard drives, tape drives, non-volatile solid-state storage such as solid-state discs, NVMe storage, customized storage based on solid stage chips, memristors, and Optane™ storage. The controller 318E may determine the offset from a starting address where the modified object is committed and include the offset in the augmented metadata of the parent object of the committed object.

Figure 4:
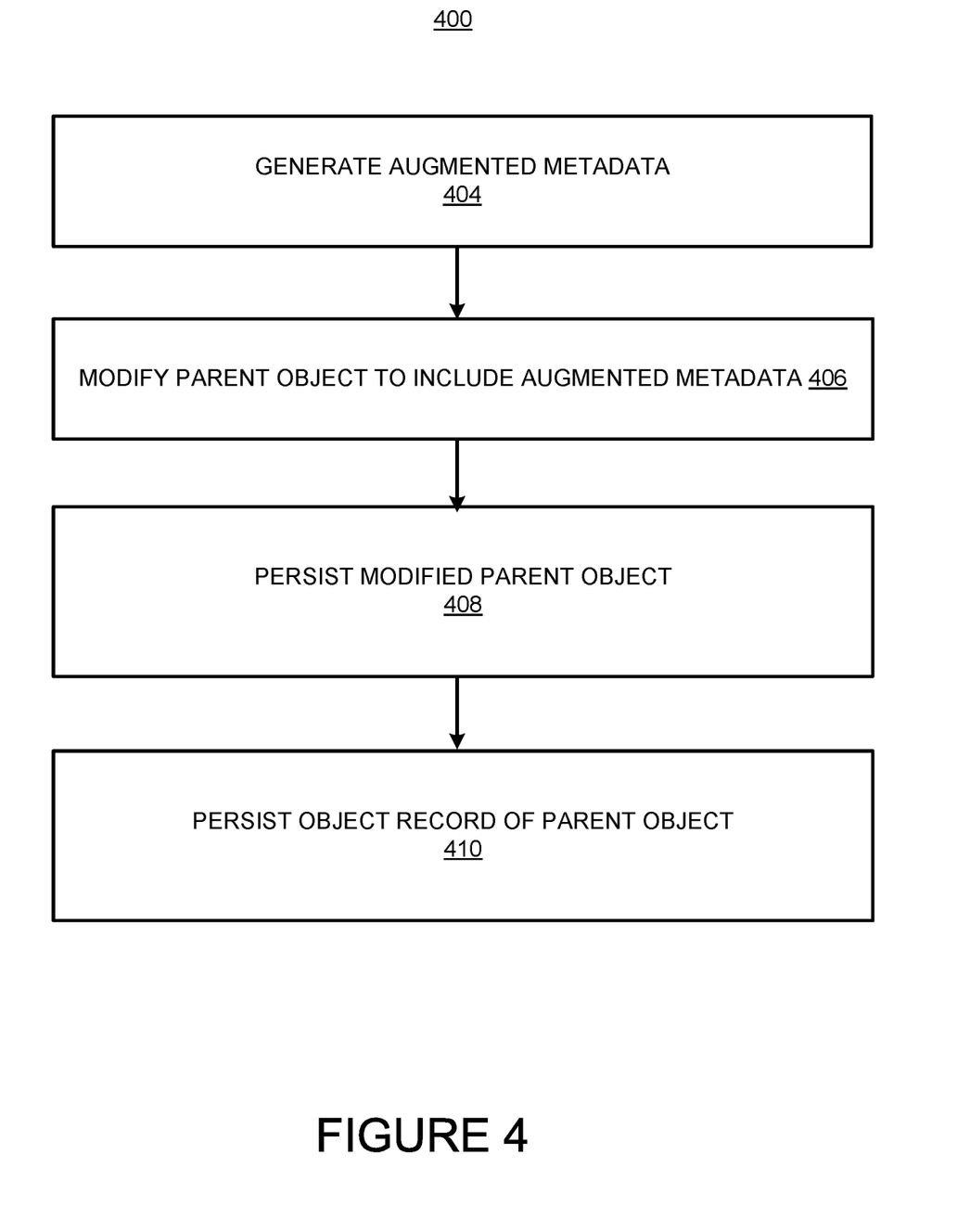
FIG. 4 illustrates a method of adding augmented metadata to an object in the object store.

FIG. 4 illustrates a method 400 according to an example for generating a parent object with augmented metadata for storage in an object store. The method 400 may be performed by the system 100 in FIG. 1 or the system of nodes in FIG. 3.

At 404, the system 100 may determine augmented metadata. In an example, the system 100 may determine augmented metadata for a parent object by determining the offset address of a child object in persistent storage. In an example, the system 100 may receive this information from the volume manager 206. The augmented metadata may include the offset address of the child object. In another example, the augmented metadata may include information about the date of creation of the child object, the date of modification of the child object and the like.

At 406, the system 100 may modify the parent object to include the augmented metadata. Also, the system 100 may modify the parent object to include a signature of the child object. The system 100 may then determine a signature of the parent object according to the cryptographic function (e.g., generating a cryptographic hash of the parent object to serve as the object signature). The system 100 may then modify the parent object to include the augmented metadata generated at 404. In an example, the system 100 may modify the parent object to include the signature of the child object and the augmented metadata before determining the signature of the parent object. The system 100 may determine the signature of the parent object excluding the augmented metadata.

At 408, the system 100 may persist the modified parent object with the augmented metadata to persistent storage 208. As described above with reference to FIG. 3, persisting an object to persistent storage 208 may indicate storing the object in a nonvolatile storage such as an SSD, Non-Volatile Storage (e.g., NVMe), Optane™ memory and the like.

At 410, the system 100 may persist an object record of the modified parent object. Also, the system 100 may persist the object record of the modified parent object to the object index 204. The record includes the physical address where the modified parent object was stored in the previous step 408. In an example, the system 100 may update the object record in the index 204 for the modified parent object associating the physical address where the parent object is stored with the encoded signature which was determined at 406 in the object record.

Figure 5:
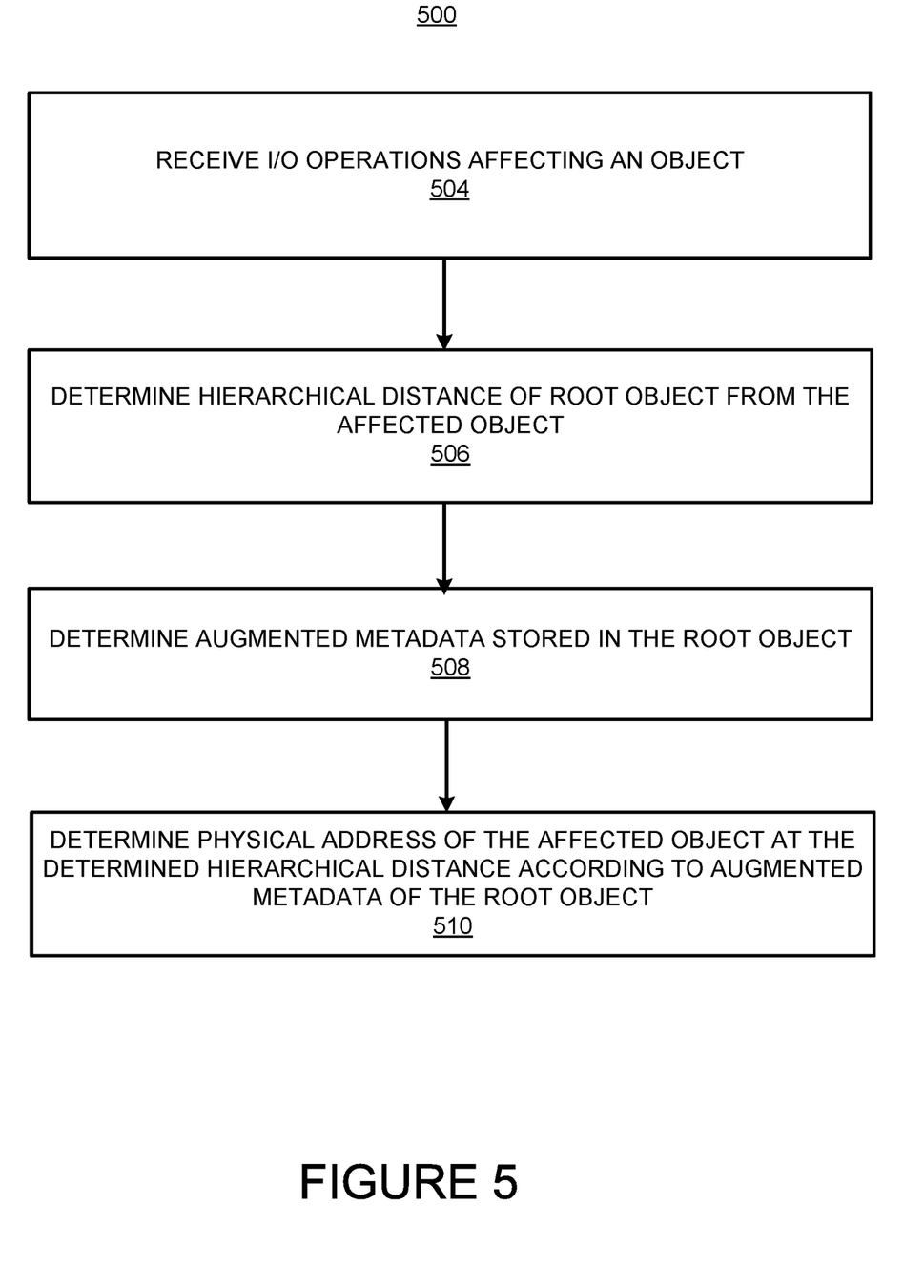
FIG. 5 illustrates a method according to an example for determining an offset address of an affected object in the object store.

FIG. 5 illustrates a method 500 according to an example for speeding up retrieval of an object in the object store. The method 500 may be performed by the system 100 in FIG. 1 or the system of nodes in FIG. 3.

At 504, the system 100 may receive I/O operations that affect a certain object. In an example, as described above with reference to FIG. 2 the system 100 may receive I/O operations to retrieve the certain object. In another example, the system 100 may receive I/O operations to move the certain object. For example, moving files between directories may result in a change in a parent object associated with the moved file.

At 506, the system 100 may determine a hierarchical distance between the root object and the affected object. In an example, to determine the hierarchical distance, the system 100 may determine the offset of a parent object of the affected object in the object store from a starting address in persistent storage. For example, the offset may be the offset from a starting address of an SSD or a starting address indicating an SSD in a plurality of SSDs. The system 100 may store recently accessed objects in an object cache. The object cache is used to speed up access to frequently accessed objects in the object store. In an example, the system may determine the signature of the affected object is not in the object cache.

The system 100 may, in response to a determination that the affected object is not in the object cache, determine the offset address of the root object. In an example, the system 100 may determine the offset address of the root object from the object index 204. The system may retrieve the root object from the persistent storage 208.

At 508, the system 100 may determine augmented metadata stored in the root object. In an example, the system 100 may determine the offset address of the root object from the object index 204. The system 100 may retrieve the root object from the persistent storage 208. In an example, the augmented metadata stored in the root object may include the physical offset from a starting address 216 were each child object is stored.

At 510, the system 100 may determine the offset address of the affected object according to the augmented metadata of the root object. In an example, the augmented metadata may store an offset address where the child object is stored in the persistent storage 208. In an example, the system 100 may access the affected object without looking up the affected object offset address in the object index 204.

Figure 6:
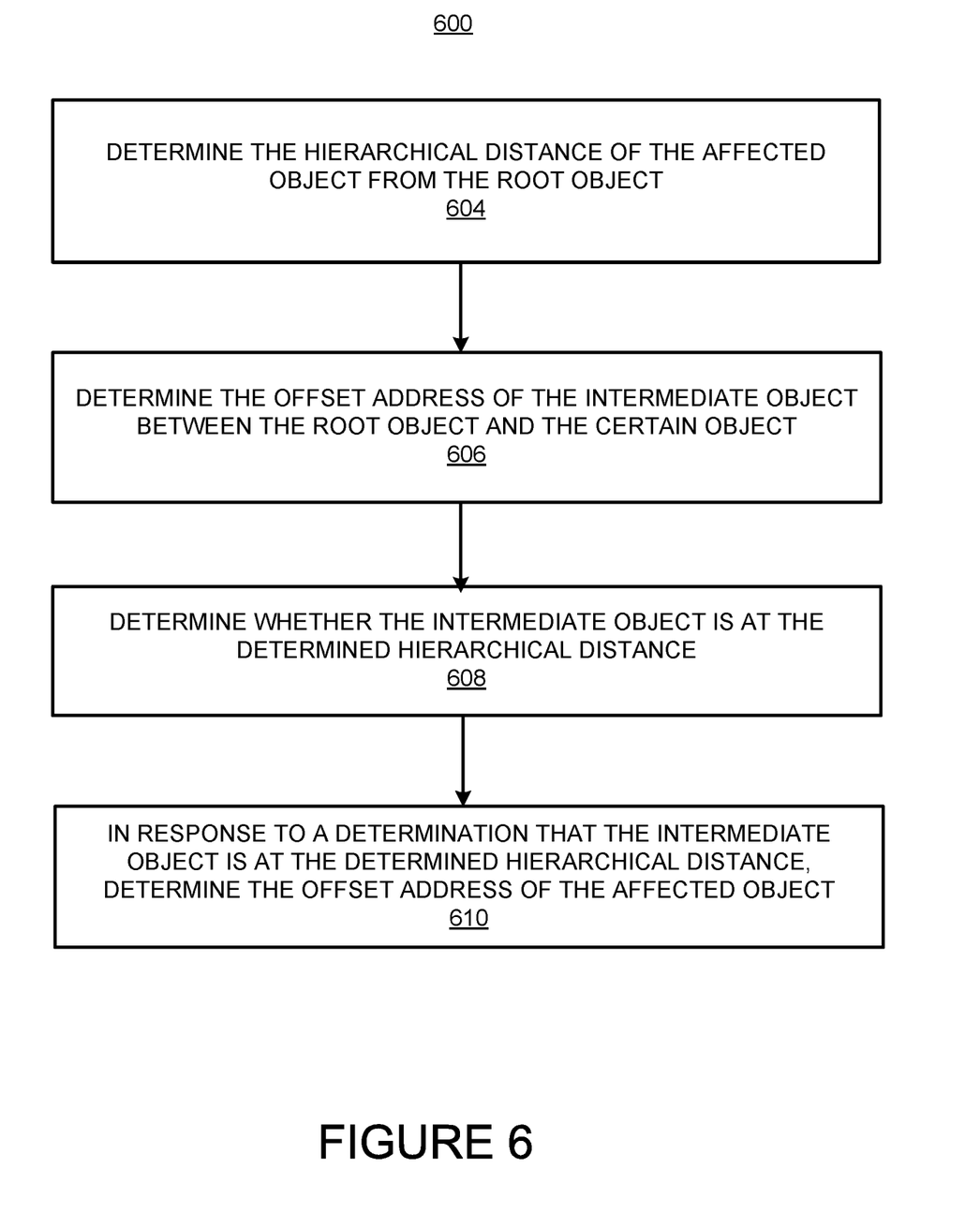
FIG. 6 illustrates a method according to an example for determining an offset address of an affected object in the object store.

FIG. 6 illustrates a method 600 according to an example for determining the offset address of an affected object in the object store. The method 600 may be performed by the system 100 in FIG. 1 or the system of nodes in FIG. 3.

At 604, the system 100 may determine the hierarchical distance between the affected object and from the root object. The system 100 may determine the certain hierarchical distance based on a mathematical algorithm for the specific object store.

At 606, the system 100 may determine an offset address where an intermediate object between the root object and the certain object is stored. In an example, the affected object may be the farthest child object from the root object located at a hierarchical distance of n from the root object. The system 100 may determine an offset address of the intermediate object attached to the root object. For example, the system 100 may determine the offset address of the intermediate object attached to the root object at a hierarchical distance of one from the root object.

At 608, the system 100 may then determine whether the intermediate object is at the determined hierarchical distance from the root object.

At 610, in response to a determination that the intermediate object is at the determined hierarchical distance, the system 100 may determine an offset address of the affected object according to an augmented metadata block stored in the intermediate object.

In another example, the system 100 may determine the offset address of its child object, e.g., an intermediate object from the augmented metadata in the root object. In an example, the system 100 may retrieve the intermediate object. The intermediate object's augmented metadata may be used to retrieve another intermediate object and so on until the system determines the retrieved object is at the determined hierarchical level. The system 100 may then determine the offset of the certain object.

While embodiments of the present disclosure have been described referring to examples, those skilled in the art can variously modify the described embodiments without departing from the claimed embodiments.

What is claimed is:

1. A non-transitory computer-readable medium comprising machine-readable instructions executable by a processor to:
in an object store for storing objects, wherein each object is identified by a signature encoded according to a cryptographic function of contents of each object, and wherein the objects stored in the object store exhibits a hierarchical relationship from a root object, the hierarchical relationship being in the form of a Merkle tree:
modify contents of a certain object in the object store to include augmented metadata to generate a modified object;
encode a signature of the modified object, wherein the signature of the modified object is identical to a signature for the certain object;
persist the modified object with the signature of the modified object to a persistent storage; and
traverse the Merkle tree from the root object to a leaf object by using an offset address in the augmented metadata of each intermediate object between the root object and the leaf object to access a child of the each intermediate object at the offset address without accessing an object index that maps each object in the object store to a respective physical address in persistent storage.

2. The non-transitory computer-readable medium of claim 1, wherein the machine-readable instructions to encode the signature of the modified object are executable by the processor to:
determine the signature of the modified object by ignoring the augmented metadata.

3. The non-transitory computer-readable medium of claim 1, wherein the machine-readable instructions to encode the signature of the modified object are executable by the processor to:
modify the certain object to include the signature of a child object; and
encode the signature of the certain object before modifying the certain object to include the augmented metadata.

4. The non-transitory computer-readable medium of claim 1, wherein the augmented metadata comprises:
a physical offset from a starting address where a child object of the certain object is stored in the persistent storage.

5. The non-transitory computer-readable medium of claim 1, wherein the augmented metadata comprises a date of modification of the modified object.

6. The non-transitory computer-readable medium of claim 1, wherein the augmented metadata comprises a date of modification of a child object of the modified object.

7. The non-transitory computer-readable medium of claim 1, wherein the augmented metadata comprises a date of creation of a child object of the modified object.

8. The non-transitory computer-readable medium of claim 1, comprising machine-readable instructions executable by the processor to:
determine whether a hierarchical distance between the root object and the modified object is greater than two;
in response to a determination that the hierarchical distance is greater than two, determine an intermediate object at a first hierarchical distance of n-1 from the modified object;
modify contents of the intermediate object to include augmented metadata storing a physical offset of the modified object;
encode a signature for the modified intermediate object ignoring the augmented metadata;
persist the modified intermediate object to the persistent storage; and
at each intermediate object between the root object and the modified object, modify the contents of the intermediate object to include augmented metadata corresponding to a child object of that intermediate object until the root object is modified to include the augmented metadata of the root object's immediate child object.

9. The non-transitory computer-readable medium of claim 1, wherein the objects are stored on object stores in nodes located on a federated peer-to-peer network of nodes, and
the machine-readable instructions are executable by the processor to:
synchronize the modified object between an object store on a first node and an object store on a second node in the federated peer-to-peer network.

10. The non-transitory computer-readable medium of claim 1, comprising machine-readable instructions executable by the processor to:
store the modified object with another object that does not include augmented metadata.

11. The non-transitory computer-readable medium of claim 1, comprising machine-readable instructions executable by the processor to:
receive I/O operations affecting a stored object in the object store;
determine a hierarchical distance of the stored object from the root object;
determine augmented metadata stored in the root object; and
determine an offset address of the stored object at the determined hierarchical distance based on the augmented metadata stored in the root object.

12. A system comprising:
a processor;
an object store for storing objects, wherein the objects stored in the object store are identified by respective signatures encoded according to a cryptographic function of contents of the objects and are related hierarchically in a Merkle tree to a root object; and
a memory to store machine-readable instructions, wherein the processor is to execute the machine-readable instructions to:
modify contents of a certain object in the object store to include augmented metadata to generate a modified object;
encode a signature of the modified object, wherein the signature of the modified object is identical to a signature for the certain object;
persist the modified object with the signature of the modified object to a persistent storage; and
traverse the Merkle tree from the root object to a leaf object by using an offset address in the augmented metadata of each intermediate object between the root object and the leaf object to access a child of the each intermediate object at the offset address without accessing an object index that maps each object in the object store to a respective physical address in persistent storage.

13. The system of claim 12, wherein the machine-readable instructions are executable by the processor to:

receive an input/output (I/O) operation affecting an object stored in the object store, wherein the affected object is a child object located at a hierarchical distance of n from the root object;
determine an offset address of an intermediate object between the root object and the affected object according to augmented metadata stored in the root object;
determine whether the intermediate object is at a determined hierarchical distance that is a distance of the affected object from the root object;
in response to a determination that the intermediate object is at the determined hierarchical distance, determine an offset address of the affected object according to augmented metadata stored in the intermediate object; and
in response to a determination that the intermediate object is not at the determined hierarchical distance, determine offset addresses of intermediate objects between the root object and the affected object according to augmented metadata of other intermediate objects until an intermediate object at the determined hierarchical distance is located to determine the offset address of the affected object.

14. The system of claim 12, wherein the augmented metadata comprises a date of creation of an object at a hierarchical level below the modified object.

15. The system of claim 12, wherein the augmented metadata comprises a date of creation of a child object of the modified object.

16. The system of claim 12, wherein the augmented metadata comprises a date of modification of a child object of the modified object.

17. A method comprising:
modifying, by a processor, contents of a parent object to include augmented metadata resulting in a modified parent object, wherein the parent object is stored in an object store, wherein each object in the object store is identified by a signature encoded according to a cryptographic function of contents of each object, and wherein the objects stored in the object store exhibit a hierarchical relationship from a root object, the hierarchical relationship being in the form of a Merkle tree;
persisting, by the processor, the modified parent object to a persistent storage;
traversing the Merkle tree from the root object to a leaf object by using an offset address in the augmented metadata of each intermediate object between the root object and the leaf object to access a child of the each intermediate object at the offset address without accessing an object index that maps each object in the object store to a respective physical address in persistent storage; and
updating, by the processor, an object record of the parent object with a content-based signature of the modified parent object and with a physical address where the modified parent object is stored, such that the signature of the modified parent object with the augmented metadata and a content-based signature of the parent object are identical.

18. The method of claim 17 comprising:
modifying, by the processor, contents of the parent object to include a signature of a child object of the parent object; and
encoding, by the processor, the parent object according to the cryptographic function.

19. The method of claim 17 comprising:
receiving, by the processor, an input/output operation affecting an object in the object store;
determining, by the processor, a hierarchical distance of the affected object from the root object;
determining, by the processor, augmented metadata stored in the root object; and
determining, by the processor, an offset address of the affected object at the determined hierarchical distance, based on augmented metadata stored in the root object.

20. The method of claim 17, wherein the augmented metadata comprises a date of creation of an object at a hierarchical level below the modified object.

* * * * *